United States Patent
Snyder

(10) Patent No.: US 10,718,220 B2
(45) Date of Patent: Jul. 21, 2020

(54) SYSTEM AND METHOD TO RETAIN A TURBINE COVER PLATE WITH A SPANNER NUT

(71) Applicant: Rolls-Royce Corporation, Indianapolis, IN (US)

(72) Inventor: Brandon R. Snyder, Greenwood, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 502 days.

(21) Appl. No.: 14/922,844

(22) Filed: Oct. 26, 2015

(65) Prior Publication Data

US 2017/0114650 A1    Apr. 27, 2017

(51) Int. Cl.
*F01D 5/30*    (2006.01)
*F01D 5/08*    (2006.01)
*F01D 5/06*    (2006.01)

(52) U.S. Cl.
CPC ............ *F01D 5/3015* (2013.01); *F01D 5/066* (2013.01); *F01D 5/082* (2013.01); *F05D 2240/15* (2013.01); *F05D 2260/31* (2013.01)

(58) Field of Classification Search
CPC ...... F01D 5/026; F01D 5/3007; F01D 5/3015; F01D 5/066; F05D 2240/15; F05D 2260/31
See application file for complete search history.

(56) References Cited

U.S. PATENT DOCUMENTS 4,432,555 A * 2/1984 Langley .................. C04B 35/83
                                                             277/644
4,452,567 A * 6/1984 Treby ...................... F01D 5/026
                                                               415/9

(Continued)

FOREIGN PATENT DOCUMENTS

EP            0921272 A2      6/1999
GB           1369513 A * 10/1974 ............... F01D 5/06

(Continued)

OTHER PUBLICATIONS

European Patent Office, Extended European Search Report for corresponding EP Application No. 1619196.0 dated Jun. 22, 2017, 8pgs.

(Continued)

*Primary Examiner* — Justin D Seabe
*Assistant Examiner* — Christopher R Legendre
(74) *Attorney, Agent, or Firm* — Shumaker & Sieffert, P.A.

(57) ABSTRACT

In accordance with some embodiments of the present disclosure, a gas turbine engine is presented. The engine has at least one turbine stage and each stage has a turbine disc concentric with the axis of the engine. The turbine disc has a turbine arm positioned axially from the disc and rigidly attached thereto. The drive arm is also concentric with the turbine axis and has an outer surface. The turbine stage also has a cover plate concentric with the turbine axis and covering at least a portion of the turbine disc. An arrangement of turbine blades are positioned around the periphery of the disc and are retained on the turbine disc at least partially by the cover plate. The system includes a spanner nut, and threads on a portion of the turbine drive arm. The spanner nut is threaded onto the turbine arm which applies (Continued)

an axial force on the cover plate, thereby retaining the cover plate.

11 Claims, 10 Drawing Sheets

(56) References Cited

U.S. PATENT DOCUMENTS

| | | | | |
|---|---|---|---|---|
| 5,173,024 | A | * | 12/1992 | Mouchel ............... F01D 5/066 416/220 R |
| 5,211,407 | A | * | 5/1993 | Glynn ................. F01D 11/006 277/632 |
| 5,310,319 | A | * | 5/1994 | Grant .................. F01D 5/082 416/220 R |
| 5,338,154 | A | | 8/1994 | Meade et al. |
| 5,577,887 | A | | 11/1996 | Gouyon et al. |
| 5,954,477 | A | * | 9/1999 | Balsdon .............. F01D 11/006 415/173.7 |
| 5,984,636 | A | * | 11/1999 | Fahndrich ............ F01D 5/081 415/178 |
| 6,077,035 | A | * | 6/2000 | Walters ............... F01D 5/081 415/115 |
| 6,106,234 | A | | 8/2000 | Gabbitas |
| 6,183,193 | B1 | * | 2/2001 | Glasspoole ............ F01D 5/08 415/115 |
| 6,851,349 | B2 | * | 2/2005 | Dohallow ............. F15B 15/16 91/169 |
| 7,331,763 | B2 | | 2/2008 | Higgins et al. |
| 7,556,474 | B2 | * | 7/2009 | Marchi ................ F01D 5/081 415/115 |
| 8,007,230 | B2 | * | 8/2011 | Hafner ................. F01D 5/08 415/173.7 |
| 8,206,119 | B2 | | 6/2012 | Liotta et al. |
| 8,517,666 | B2 | | 8/2013 | Alvanos et al. |
| 8,662,845 | B2 | | 3/2014 | Virkler et al. |
| 8,740,554 | B2 | | 6/2014 | Virkler et al. |
| 8,800,133 | B2 | | 8/2014 | Caprario et al. |
| 2004/0219008 | A1 | | 11/2004 | Judet et al. |
| 2013/0108462 | A1 | | 5/2013 | Harris, Jr. et al. |
| 2014/0086740 | A1 | | 3/2014 | Arnold |
| 2014/0248136 | A1 | * | 9/2014 | Lucas ................. F01D 5/026 415/151 |
| 2014/0301849 | A1 | | 10/2014 | Snyder |
| 2017/0114650 | A1 | * | 4/2017 | Snyder ............... F01D 5/3015 |
| 2017/0114651 | A1 | * | 4/2017 | Snyder ............... F01D 5/082 |

FOREIGN PATENT DOCUMENTS

| | | |
|---|---|---|
| WO | 00/71854 A1 | 11/2000 |
| WO | 2014137406 A1 | 9/2014 |

OTHER PUBLICATIONS

Communication under Rule 71(3) EPC from counterpart EP application No. 16191960.0, dated Sep. 13, 2018, 65 pgs.
Response to the official communication under Rule 71(3) EPC from counterpart EP application No. 16191960.0, dated Apr. 5, 2018, filed Jul. 30, 2018, 13 pgs.
Communication under Rule 71(3) EPC from counterpart EP application No. 16191960.0, dated Apr. 5, 2018, 67 pgs.
Response to the Extended European Search Report from counterpart EP application No. 16191960.0, dated Jun. 22, 2017, filed Jan. 26, 2018, 17 pgs.

* cited by examiner

SYSTEM AND METHOD TO RETAIN A TURBINE COVER PLATE WITH A SPANNER NUT

RELATED APPLICATIONS

This application is related to concurrently filed applications U.S. patent application Ser. No. 14/922,932 entitled. "A SYSTEM AND METHOD TO RETAIN A TURBINE COVER PLATE BETWEEN NESTED TURBINES WITH A TIE BOLT AND SPANNER NUT" The entirety of these applications are incorporated herein by reference.

BACKGROUND

Fluid propulsion devices achieve thrust by imparting momentum to a fluid called the propellant. An air-breathing engine, as the name implies, uses the atmosphere for most of its propellant. The gas turbine produces high-temperature gas which may be used either to generate power for a propeller, fan, generator or other mechanical apparatus or to develop thrust directly by expansion and acceleration of the hot gas in a nozzle. In any case, an air breathing engine continuously draws air from the atmosphere, compresses it, adds energy in the form of heat, and then expands it in order to convert the added energy to shaft work or jet kinetic energy. Thus, in addition to acting as propellant, the air acts as the working fluid in a thermodynamic process in which a fraction of the energy is made available for propulsive purposes or work.

Typically gas turbine engines include at least two air streams. All air utilized by the engine initially passes through a fan, and then it is split into the two air streams. The inner air stream is referred to as core air and passes into the compressor portion of the engine, where it is compressed. This air then is fed to the combustor portion of the engine where it is mixed with fuel and the fuel is combusted. The combustion gases are then expanded through the turbine portion of the engine, which extracts energy from the hot combustion gases, the extracted energy being used to run the compressor, the fan and other accessory systems. The remaining hot gases then flow into the exhaust portion of the engine, which may be used to produce thrust for forward motion to the aircraft.

The outer air flow stream bypasses the engine core and is pressurized by the fan. Typically, no other work is done on the outer air flow stream which continues axially down the engine but outside the core. The bypass air flow stream also can be used to accomplish aircraft cooling by the introduction of heat exchangers in the fan stream. Downstream of the turbine, the outer air flow stream is used to cool engine hardware in the exhaust system. When additional thrust is required (demanded), some of the fans bypass air flow stream may be redirected to the augmenter (afterburner) where it is mixed with core flow and fuel to provide the additional thrust to move the aircraft.

Referring to the drawings wherein identical reference numerals denote the same elements throughout the various views, FIG. 1 shows a general orientation of a turbofan engine in a cut away view. In the turbofan engine shown, the flow of the air is generally axial. The engine direction along the axis is generally defined using the terms "upstream" and "downstream" generally which refer to a position in a jet engine in relation to the ambient air inlet and the engine exhaust at the back of the engine. For example, the inlet fan is upstream of the combustion chamber. Likewise, the terms "fore" and "aft" generally refer to a position in relation to the ambient air inlet and the engine exhaust nozzle. Additionally, outward/outboard and inward/inboard refer to the radial direction. For example the bypass duct is outboard the core duct. The ducts are generally circular and co-axial with each other.

As ambient inlet airflow 12 enters inlet fan duct 14 of turbofan engine 10, through the guide vanes 15, passes by fan spinner 16 and through fan rotor (fan blade) 42. The airflow 12 is split into primary (core) flow stream 28 and bypass flow stream 30 by upstream splitter 24 and downstream splitter 25. The bypass flow stream 30 along with the core/primary flow stream 28 is shown, the bypass stream 30 being outboard of the core stream 28. The inward portion of the bypass stream 30 and the outward portion of the core streams are partially defined by the splitters upstream of the compressor 26. The fan 42 has a plurality of fan blades.

As shown in FIG. 1 the fan blade 42 shown is rotating about the engine axis into the page, therefor the low pressure side of the blade 42 is shown, the high pressure side being on the opposite side. The primary flow stream 28 flows through compressor 26 that compresses the air to a higher pressure. The compressed air typically passes through an outlet guide vane to straighten the airflow and eliminate swirling motion or turbulence, a diffuser where air spreads out, and a compressor manifold to distribute the air in a smooth flow. The core flow stream 28 is then mixed with fuel in combustion chamber 35 and the mixture is ignited and burned. The resultant combustion products flow through turbines 38 that extract energy from the combustion gases to turn fan rotor 42, compressor 26 and any shaft work by way of turbine shaft 40. The gases, passing exhaust cone, expand through an exhaust nozzle 43 to produce thrust. Primary flow stream 28 leaves the engine at a higher velocity than when it entered. Bypass flow stream 30 flows through fan rotor 42, flows by bypass duct outer wall 27, an annular duct concentric with the core engine flows through fan discharge outlet and is expanded through an exhaust nozzle to produce additional thrust. Turbofan engine 10 has a generally longitudinally extending centerline represented by engine axis 46.

The turbine inlet temperature is very high and the turbine requires materials with special heat resistant and strength characteristics. The turbine blades are held by the turbine disc and the turbine discs are typically do not possess all of the characteristics of the blades and should be protected from the hot gases passing through the turbine blades. Additionally the flow of cooling gases is advantageously controlled throughout the engine. Full face cover plates are used to isolate the turbine discs from the hot gasses, retain the turbine blades and establish flow paths for cooling gases. These cover plates are typically provided for each of the turbine discs and in particular the high pressure turbine stages with cooled blades, where the gases are the hottest.

Full face cover plates are typically assembled with the turbine disc using a retaining ring, bayonet features or a bolted flange. However some configurations due to space or access cannot accommodate a flange or bayonet features, and similarly due to the size of the wheel may not be sufficient to allow for a retaining ring.

FIG. 2 illustrates a cutaway of a turbine disc 200. The forward face of the disc 200 is covered by full face cover plate 202, full face cover plate 202 being held in place by retaining ring 204. A retaining ring may also be used to secure a cover on the aft face of the disc 200. Installing retaining rings, such as ring 204, requires special tooling, which adds cost and complexity, and sufficient assembly access which may be limited in applications of turbines with small diameters.

FIG. 3 illustrates a cutaway of a turbine disc 300. The forward face of disc 300 is covered by full face cover plate 302, full face cover plate 302 being held in place by bolted flange 304. Using a bolted flange 304 adds additional components and weight to the assembled turbine system. This increase in weight tends to cause a bolted flange to be heavier than using a retaining ring. A bolted flange also requires sufficient space for wrench access during assembly which may be limited or not available depending on the applications. Additionally, a bolted flange reduces engine efficiency by creating windage losses. These losses can be eliminated by using a shield such as shield 306. However, this additional component further increases costs, complexity of assembly and even more weight.

FIG. 4 illustrates a cutaway of a turbine disc 400. The forward face of the disc 400 is covered by partial face cover plate 402. This partial face cover plate 402 is held in place using bayonet features 404. These bayonet features 404 require additional machining of the cover plate 402 and disc 400 and are not axisymmetric which can lead to high local stresses. Additionally, special tooling is needed to install cover plate 402 using bayonet features 404 adding to the cost and complexity of turbine assembly.

As disclosed in some embodiments herein the current subject matter addresses these deficiencies by utilizing a spanner nut and buttress threads on the turbine wheel drive arm to axially restrain the full face cover plate against the turbine disc rim face. The current subject matter requires no special assembly tooling (as is required for retaining ring and bayonet features assemblies) is lighter weight and has fewer parts than a bolted flange, and offers a simplified assembly process, simplified machining, variable and repeatable load control and no high stress 3D features.

The disclosed subject matter in accordance with some embodiments also addresses these deficiencies between the turbine disc of a multi-stage turbine by utilizing the tie bolt and spanner nut assembly to clamp the cover plated between an axial stop on the first stage disc and the rim of the second stage disc. This approach also requires no special assembly tooling (as is required for retaining ring and bayonet features assemblies) is lighter weight and has fewer parts than a bolted flange, and offers a simplified assembly process, simplified machining, variable and repeatable load control and no high stress 3D features.

In accordance with some embodiments of the present disclosure, a gas turbine engine is presented. The engine has at least one turbine stage and each stage has a turbine disc which is concentric with the axis of the engine. The turbine disc has a turbine arm positioned axially from the disc and rigidly attached thereto. The drive arm is also concentric with the turbine axis and has an outer surface. The turbine stage also has a cover plate concentric with the turbine axis and covering at least a portion of the turbine disc. An arrangement of turbine blades are positioned around the periphery of the disc and are retained on the turbine disc at least partially by the cover plate. The system includes a spanner nut and threads on a portion of the turbine drive arm. The spanner nut is threaded onto the turbine arm which applies an axial force on the cover plate, thereby retaining the cover plate.

In accordance with some embodiments of the present disclosure, a turbine assembly is provided. The assembly includes a turbine disc having a center axis and a radially outer rim, a turbine disc arm coaxial with the turbine disc and extending axially from the disc and having a threaded portion, a cover plate having a first end and a second end which is coaxial with the turbine disc and a spanner nut coaxial with the turbine disc. The spanner nut is threaded onto the turbine disc arm and contacts the first end of the turbine cover plate and holds the second end in contact with the outer rim.

In accordance with some embodiments of the present disclosure, a method of retaining a cover plate is provided. A gas turbine engine comprises an axis, turbine disc and a cover plate. The turbine disc is coaxial with the axis and includes an arm extending axially from the turbine disc. The turbine disc also includes a rim around a periphery of the disc. The cover plate defines a first and second end concentric openings, each opening with a radius greater than the radius of the arm. The arm of the turbine disc is threaded to produce a threaded arm. The cover plate is moved axially such that the arm is within the openings. The second end of the cover plate is positioned proximate to the rim of the turbine disc. A rotation is applied to the spanner nut, thereby threading the spanner nut onto the threaded arm. This rotation is coaxial with the axis. The spanner nut contacts the cover plate and applies a force via the contact to retain the second end against the rim.

These and many other advantages of the present subject matter will be readily apparent to one skilled in the art to which the invention pertains from a perusal of the claims, the appended drawings, and the following detailed description of preferred embodiments.

DETAILED DESCRIPTION

Figure 1:
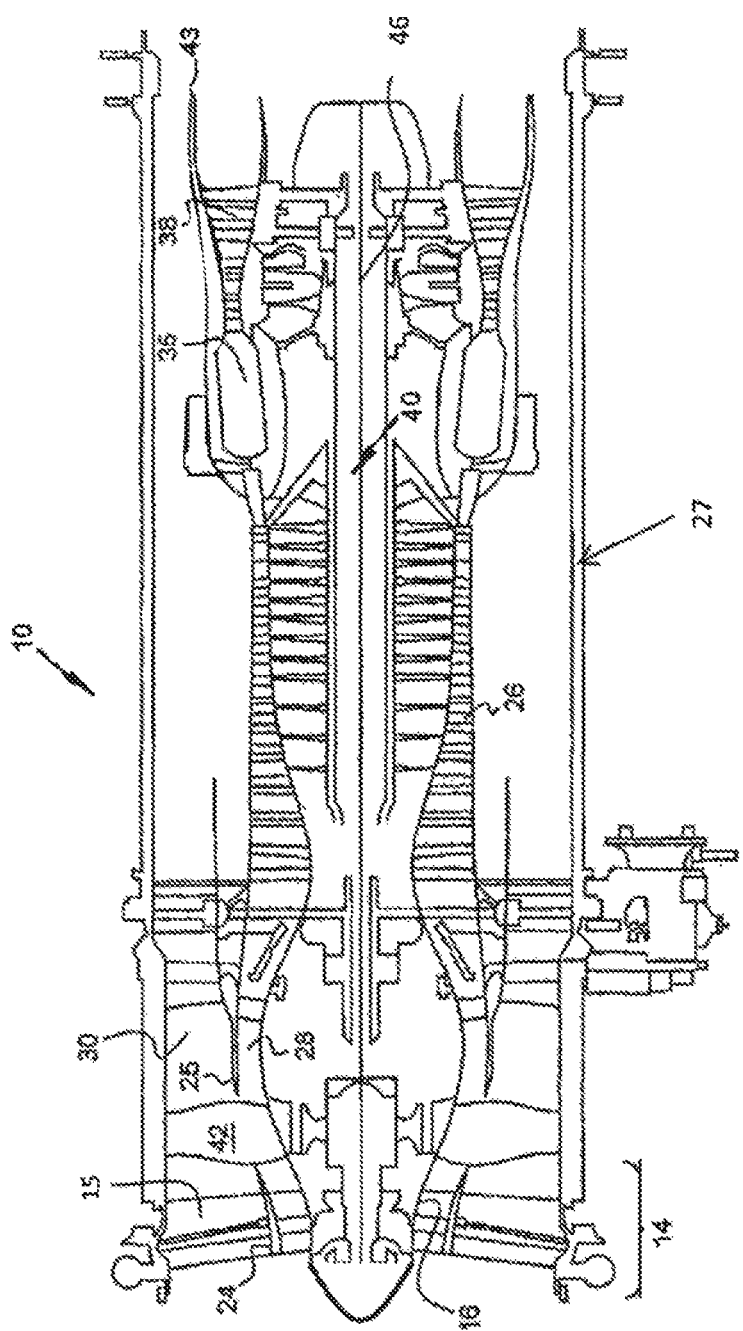
FIG. 1 is an illustration representing conventional turbofan engines.
Figure 1:
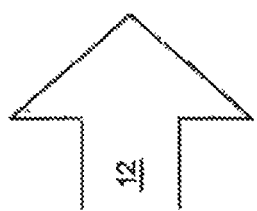
Figure 2:
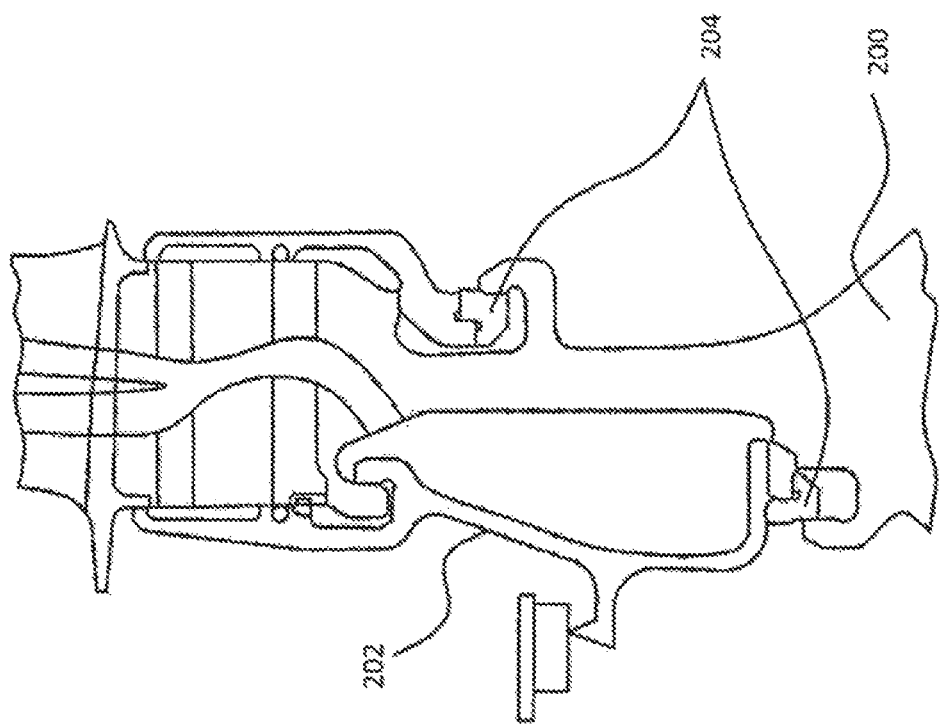
FIG. 2 is an illustration of a prior art turbine disc with a retaining ring.
Figure 3:
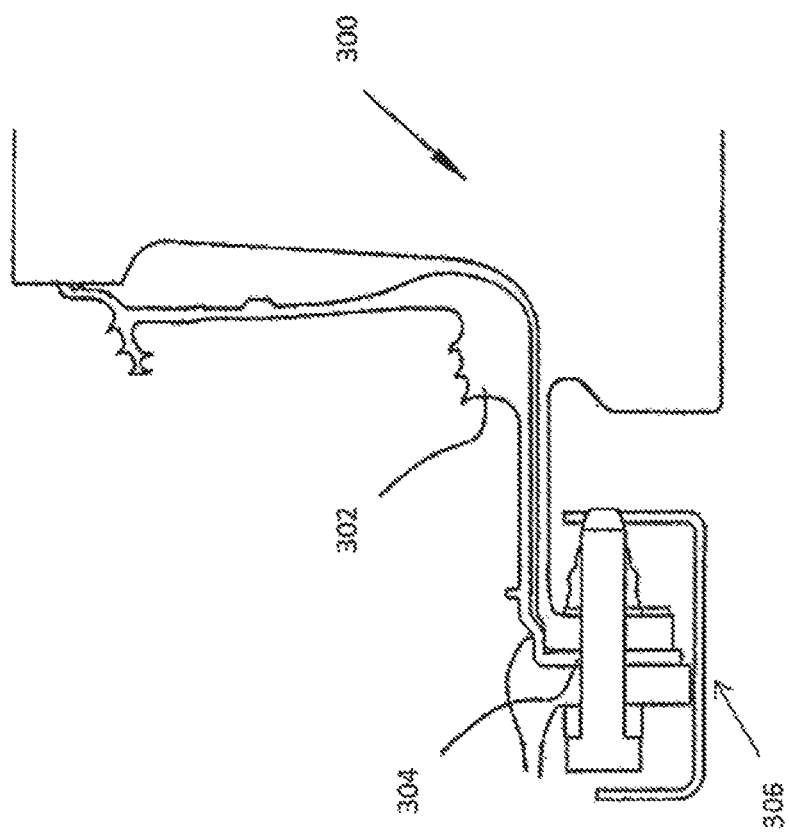
FIG. 3 is an illustration of a prior art turbine disc with a flange.
Figure 4:
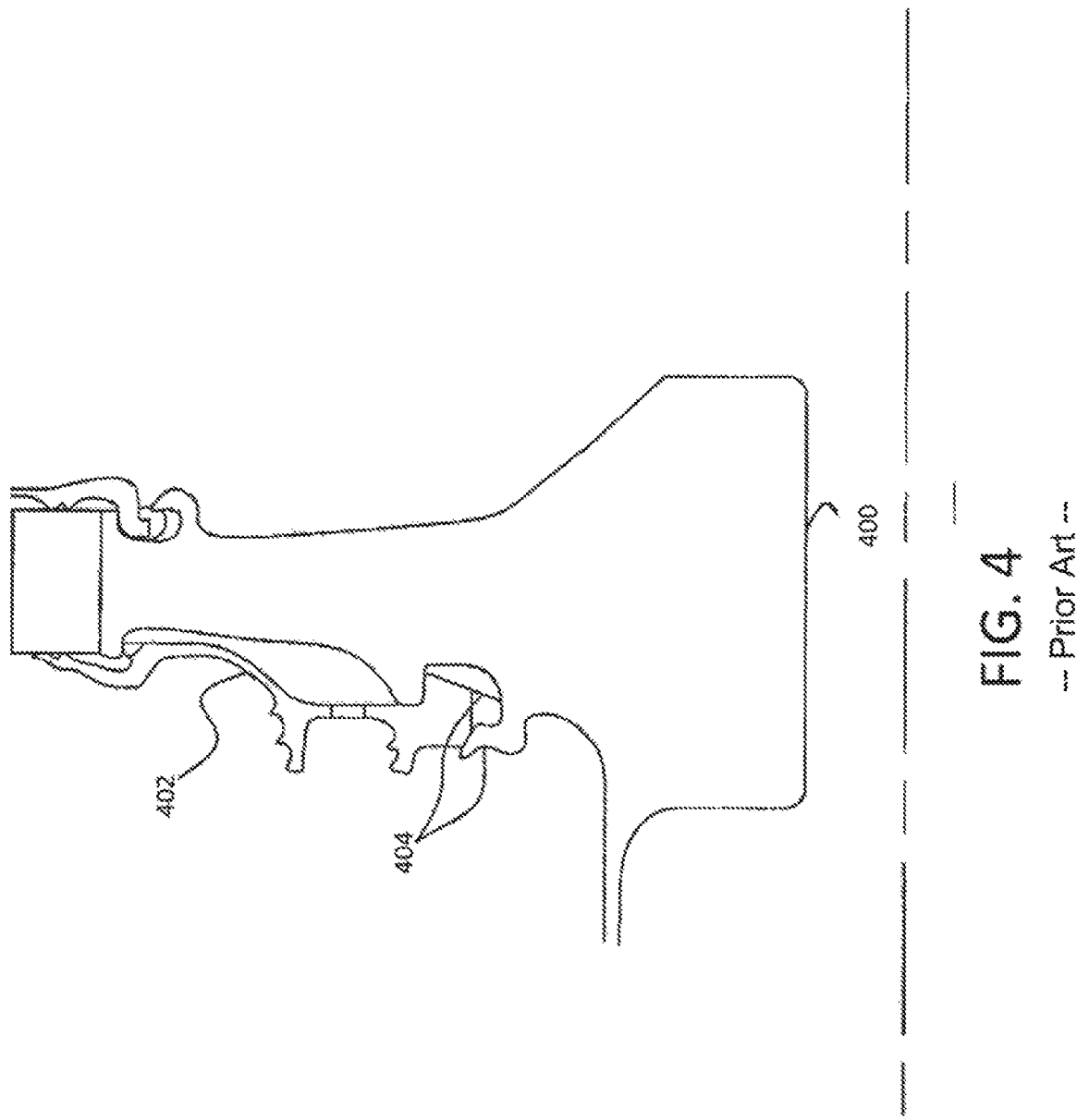
FIG. 4 is an illustration of a prior art turbine disc with a bayonet feature.
Figure 5:
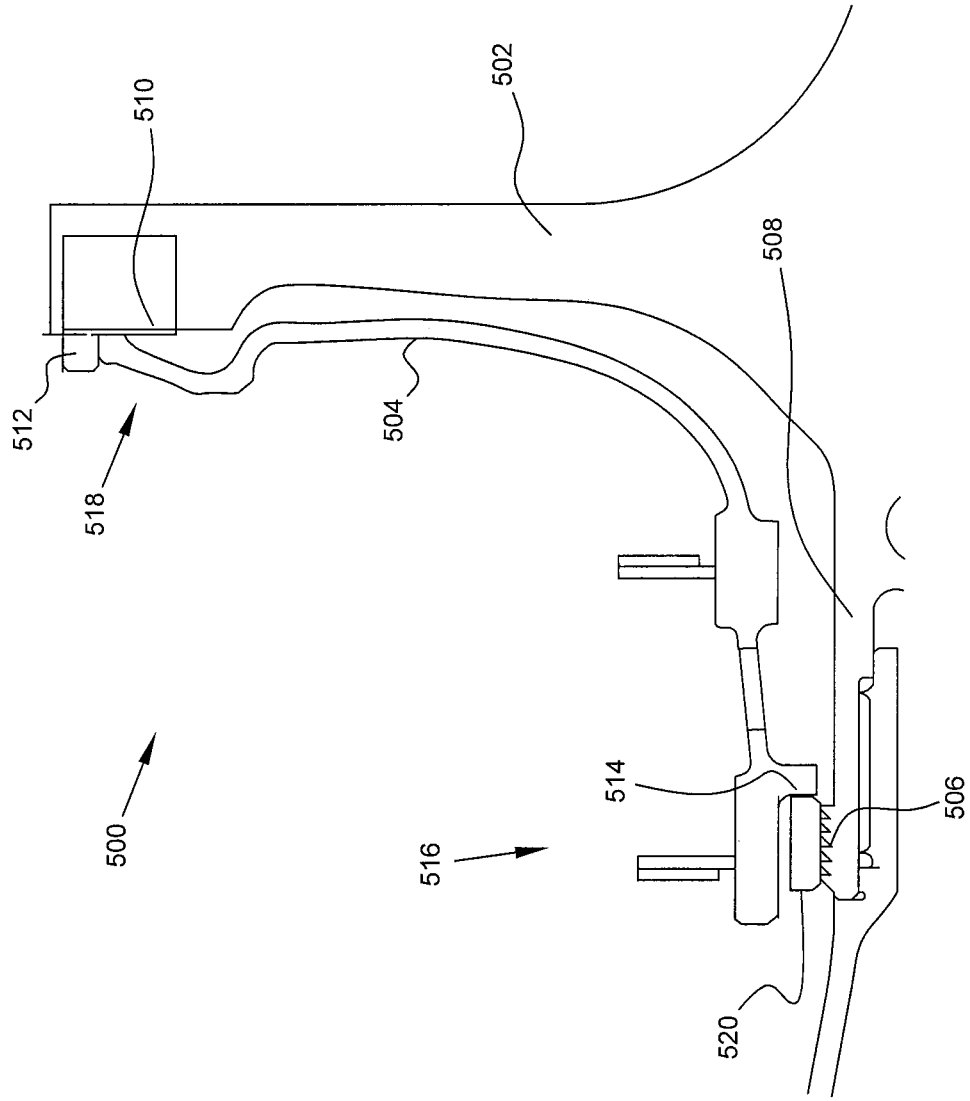
FIG. 5 is an illustration of an embodiment of the current subject matter including a spanner nut and buttress threads on the turbine disc drive arm.

In some embodiments of the present disclosure, a spanner nut and buttress threads on a turbine wheel drive arm to axially restrain a full face cover plate against the turbine disc rim face, thereby securing the cover plate. FIG. 5 illustrates an embodiment of the current subject matter including a spanner nut and buttress threads on a turbine disc drive arm in a turbine stage 500 of a gas turbine engine. The turbine disc 502 comprises a turbine drive arm 508, disc rim face 510 and pilot tabs 512. The disc may further comprise an arrangement of turbine blades (not shown) positioned around the periphery of the turbine disc 502, the arrangement being concentric with the axis of the engine. The arrangement of blades may be retained on the turbine disc 502 in part by the cover plate 504. The disc 502 has a center axis coaxial with and is concentric to the engine axis.

The drive arm 508 extends axially forward from and is rigidly attached to the disc 502. Both drive arm 508 and disc 502 are concentric to the turbine engine centerline axis. The drive arm 508 may also be coaxial or concentric to the disc 502 axis. The drive arm 508 has an outer surface upon which threads or a threaded portion 506 are formed near the forward portion of the arm. The threads 506 may be buttress threads. Buttress threads refers to its breech locking function.

The disc rim face 510 is located at outward end of the disc 502. The rim upon which face 510 is located forms the periphery of the disc 502 and may comprise a series or arrangement of turbine blade inserts. The turbine blade inserts accept turbine blades and prevent their radial movement during engine operation. The outer rim and/or disc rim face 510 may comprise a plurality of turbine disc pilot tabs 512 which engage the cover plate 504 to prevent the radial and aft-axial movement of the plate 504. In some embodiments the cover plate 504 may engage only the disc rim. In some embodiments the cover plate may also have a pilot diameter which interfaces with an inner diameter of the disc rim.

Cover plate 504 is used to cover at least a portion of the turbine disc 502 in order to protect it from high temperature working fluid. The plate 504 may be full or partial face, meaning that the entirety or only a portion, respectively, of the disc 502 face may be covered by plate 504. The plate 504 is concentric with the axis of the disc 502 and drive arm 508. The plate 504 may comprise a first end 516 and a second end 518 each coaxial with the disc 502 axis. The first end may be proximate the drive arm 508 and the second end 518 may be in contact with the disc rim face 510, and the cover 504 may extend between the two. In some embodiments, the second end 518 may be used to help secure the turbine blades by preventing their forward axial movement. The cover plate 504 may further comprise an axial stop 514. The axial stop 514 extends inwardly from the first end 516 and provides for the physical contact with spanner nut 520. This contact restrains the cover plate in the forward axial direction. Additionally, the contact with the spanner nut 520 creates an axial clamp between the nut 520 and turbine disc 502, thereby restraining the axial movement of the plate 504. The second end 518 engages the disc 502 and/or outer rim face 510 and disc pilot tabs 512 to prevent the aft-axial and radial movement of the plate 504.

The cover plate 504 may be comprised of a resilient material. In some embodiments, this material may be nickel, cobalt, titanium or an alloy of any or a combination thereof.

The axial clamp load constraining the plate 504 is created by the disc 502 and the spanner nut 520. More specifically, in some embodiments the axial clamp load is created when the spanner nut 520 is threaded onto the drive arm threads 506 of the drive arm 508. The nut 520 engages the plate 504, and in some embodiments the axial stop 514. The spanner nut 520 is concentric with the drive arm 508 and the engine axis.

In some embodiments, the spanner nut 520 further comprises a relative rotation restriction or prevention feature. This feature prevents the unintentional unthreading of nut 520 from arm 508, which would reduce the axial load on plate 504 and may allow axial or radial movement of the plate. This unthreading may be caused by loading stresses or vibrations occurring during engine operation. The retention feature may be a dimpled surface, scalloped surface, or a facet and a slot.

In some embodiments, the turbine stage or assembly 500 may further comprise a relative rotation locking device (not shown) to prevent the relative rotation of the nut 520 to the drive or disc arm 502. The device may consist of locking plates, retaining rings, tangs, lugs and keys and retaining pins or the like.

By replacing the retaining ring, bayonet feature and bolted flanges methods of securing a cover plate with a spanner nut drive arm method, the complexity of the turbine stage assembly is reduced, special tools are eliminated, and the overall weight of the system is lowered. The spanner nut 520 is also axisymmetric which helps reduce high three dimension stresses.

A turbine may comprise one or more stages utilizing the above embodiment.

In some embodiments, the first and second ends 516, 518 each comprise an opening concentric with the drive arm 508, wherein the openings each have a radius greater than the radius of the drive arm 508. Such openings allow the cover plate 504 to be moved axially over the drive arm 508 such that the plate 504, or second end 518, engage the pilot tab 512, rim outer face 510 and/or disc 502. The spanner nut 520 can then be rotated to thread the nut 520 onto the drive arm 508. When the nut 520 contacts the cover plate 504 and/or axial stop 514, a force is imparted to the cover plate 504, thereby securing it in place. In some embodiments, this force is predetermined and corresponds to the extent of the rotation of the nut 520.

Figure 6:
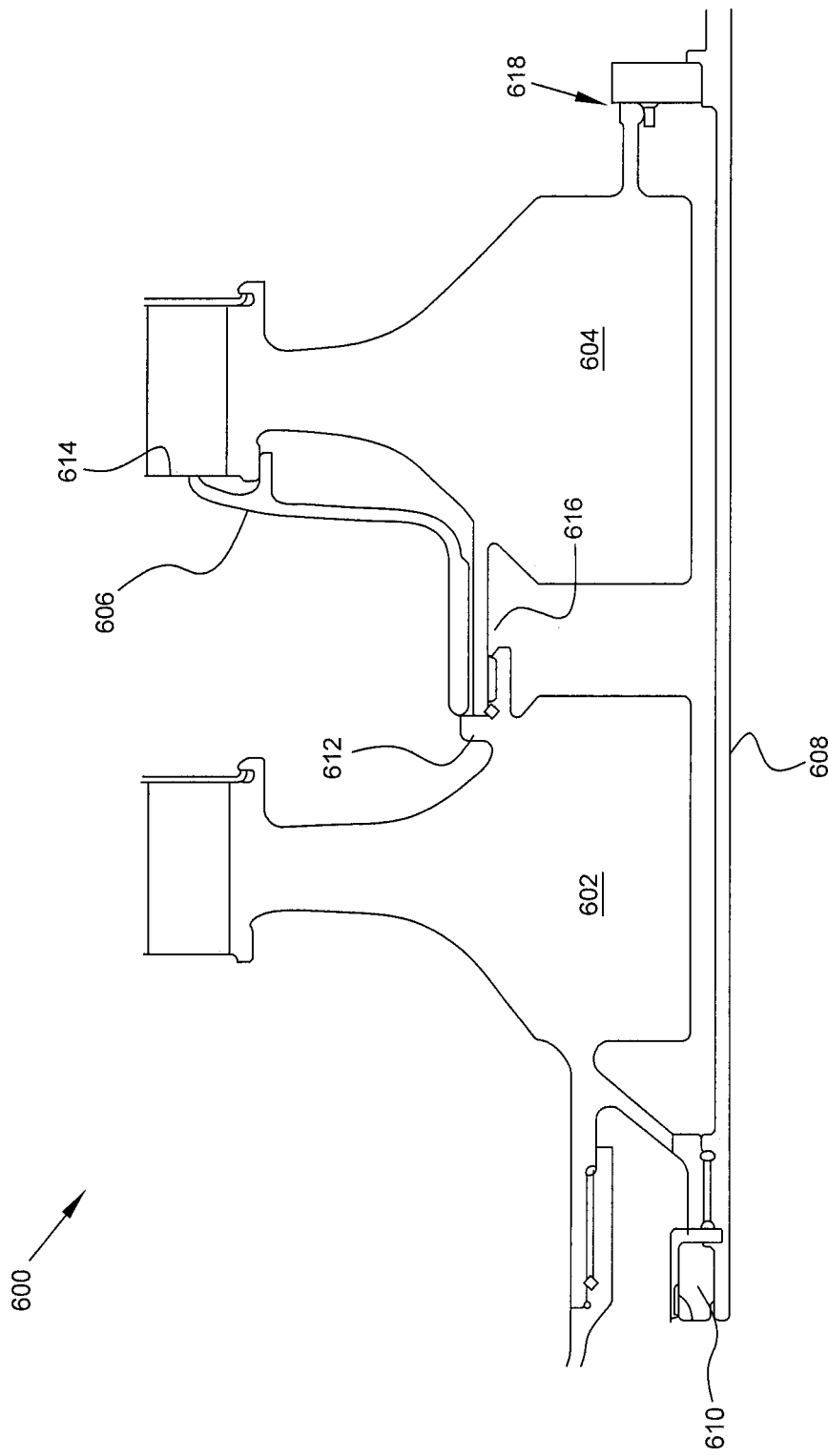
FIG. 6 is an illustration of an embodiment of the current subject matter with a first turbine disc axial stop compressing a cover plate for a second turbine disc to the axial until contact with the second turbine disc forward arm.

In accordance with some embodiments of the present disclosure, a tie bolt and spanner nut assembly clamp a cover plate between an axial stop on a first stage disc and a rim on a second stage disk of a multi-stage turbine. The multi-stage turbine may be a high pressure turbine. FIG. 6 illustrates an embodiment of the current subject matter with a first turbine disc axial stop compressing a cover plate for a second turbine disc and contacting the second turbine disc forward arm in a multi-stage turbine 600. The turbine 600 includes a first disc 602, second disc 604, cover plate 606, tie bolt 608 and spanner nut 610.

The first and second discs 602, 604 are coaxial with the engine axis. The first disc 602 has a face disposed on the aft end of the disc 602 opposite to a face on the forward end of disc 604. An axial stop 612 extends aft from the aft face of the disc 602. The axial stop 612 operably engages the cover plate 606 and disc 604. This arrangement secures the forward axial movement of both the cover plate 606 and the disc 604 as well as the radial movement of both. The axial stop 612 may comprise one or more grooves or other retaining features in the first disc 602.

In some embodiments, the axial stop 612 may comprise an axial and a radial protrusion. The axial protrusion engages and prevents the radially inward movement of the forward arm 616. The radial protrusion engages the cover plate 606 and the forward arm 616, thereby preventing the axial movement of both.

The second disc 604 includes a forward arm 616 extending axially forward from the forward face of the disc 604. The forward arm 616 is coaxial with the engine axis and forms a distal end forward of disc 604. The forward arm 616 is designed to operably engage, with the distal end, the axial stop 612 of disc 602 in order to restrain the forward axial movement of disc 604. The forward arm 616 further supports the axial loads created by the operation of the spanner nut 610 and tie bolt 608. In some embodiments, the second disc 604 further comprises an aft arm used to engage a second axial stop 618, the second axial stop 618 configured to prevent reward axial movement of the second disc 604. The second disc may further comprise a disc rim 614 at its periphery and an arrangement of turbine blades inserts (not shown) positioned around the periphery of the second disc 604. The turbine blades are concentric with the second disc 604 and are at least partially axially restrained by the cover plate 606. In some embodiments, the second disc 604 may further comprise a plurality of pilot tabs (not shown) on the disc rim face 614 which engage the cover plate 606.

The cover plate 606 is coaxial with the first and second discs 602,604. The plate 606 extends aft from the axial stop 612 toward the second disc 604 and outward from the forward arm 616 to the periphery or disc rim of the second disc 604. The plate 606 may comprise a first and second end, the first end being proximate the axial stop 612 and the second end being proximate and/or in contact with the second disc rim 614. Each end may define an opening concentric with the turbine axis and with a radius greater than the radius of the forward arm 616. The second end of plate 606 may restrict the axial movement of the turbine blade inserts in the second disc 604. Further, the second end of plate 606 may engage the pilot tabs on the second disc 604 to restrict the radial movement of the second end and the plate 606. In some embodiments, the plate 606 further comprises a cover plate axial stop (not shown) which extends radially inward from the first end of plate 606 and contacts the axial stop 612 of disc 602. The plate 606 may cover all or a portion of the second disc 604.

In some embodiments, the cover plate 606 is comprised of a resilient material which may include nickel, cobalt, titanium or alloys of any or a combination of the preceding.

The turbine 600 further comprises a tie bolt 608 and spanner nut 610. The tie bolt 608 is coaxial with the turbine and extends from the after end of the second disc 604 to the forward end of the first disc 602. Bolt 608 is designed to engage the spanner nut 610 to provide an axial clamping force which brings together discs 602 and 604 and securely attaches the cover plate 606 to the second stage disc. In turbines with more than two stages, the bolt 608 may extend through each stage. The spanner nut 610 is used to operably engage an end of the tie bolt 608. Tightening the spanner nut 610 on the tie bolt 608 generates the axial force, or axial clamp load, needed to secure the first and second discs 602,604 and the cover plate 606. This clamps, or axially compresses, the cover plate 606 between the axial stop 612 and the second disc 604. Spanner nut 610 further prevents the forward axial movement of disc 602.

In some embodiments, the spanner nut 610 further comprises relative rotation restriction features designed to prevent the relative rotational motion between the tie bolt 608 and the spanner nut 610. Such motion may cause the unintentional unthreading of the spanner nut 610, thereby releasing the axial clamping force and potentially causing the cover plate 606 to become free or loose. Additionally, the first disc 602, second disc 604 or both could become loose, thereby allowing relative motion between the two. Such motion could create undesirable and uncontrolled contacts and vibrations which can lead to engine failure. The relative rotation restriction features may be dimpled surfaces, a scalloped surface, and/or a facet and a slot.

In accordance with some embodiments of the present disclosure, a method of retaining a cover plate is provided. The first and second discs 602 and 604 may be arranged over the tie bolt 608 with the cover plate 606 positioned between the discs. The second end of the plate 606 may be positioned near the rim or rim face 614 of the second disc 604. In some embodiments, the second end may be positioned to operably engage pilot tabs on the second disc 604. The first end of the plate 606 is positioned proximate to the axial stop 612 of the first disc 602. The spanner nut 610 is then threaded onto the tie bolt 608 by applying a rotation to the nut 610 coaxial with the engine axis. The threading of the spanner nut 610 will draw the first disc 602 axially aft along the tie bolt, causing the first disc 602 to contact the cover plate 606 and second disc 604. In some embodiments this contact may occur with the first end of the cover plate 606 and the forward arm 616. The force generated by this contact may be predetermined and corresponds to the rotation of the spanner nut 610.

The forward edge of the cover plate 606 or its first end may extend beyond the forward arm 616 of the second disc 604. As the nut 610 is tightened on the tie bolt 608, the cover plate 606 will be axially compressed between the axial stop 612 and the second disc 604. The spanner nut 610 is tightened until the cover plate 606 is fully compressed and the forward arm 616 is in full contact with the axial stop 612 at the desired clamping load. By fully contacting the axial stop 612 with the forward arm 616 the primary path for the clamping and other axial loads between the first and second discs is through the stop and the arm, and not through the cover plate 606.

The method provides for the stacked assembly of multi-stage turbines which reduces assembly time, complexity and costs versus the prior art methods. Additionally, the assembly access requirements of bolted flange and retaining rings are removed, allowing cover plates to be used in applications with smaller diameters. Special tooling is no longer required and the potential for high stress three dimensional features is reduced. The method of the present disclosure simplifies assembly as components are axisymmetric. Finally, the weight of the assembled turbine is reduced.

Figure 7:
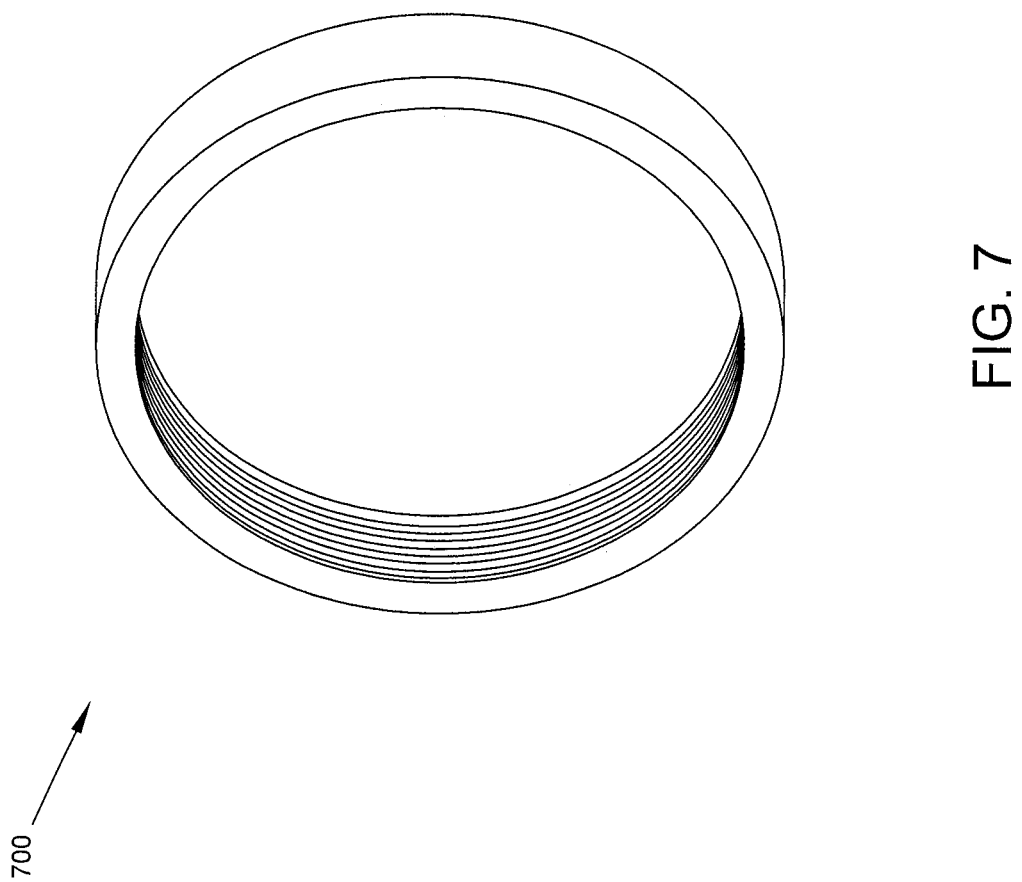
FIG. 7 is an isometric view of a spanner nut according to an embodiment of the current subject matter.

FIG. 7 illustrates an isometric view of a spanner nut 700 in accordance with some embodiments of the present invention.

Figure 8:
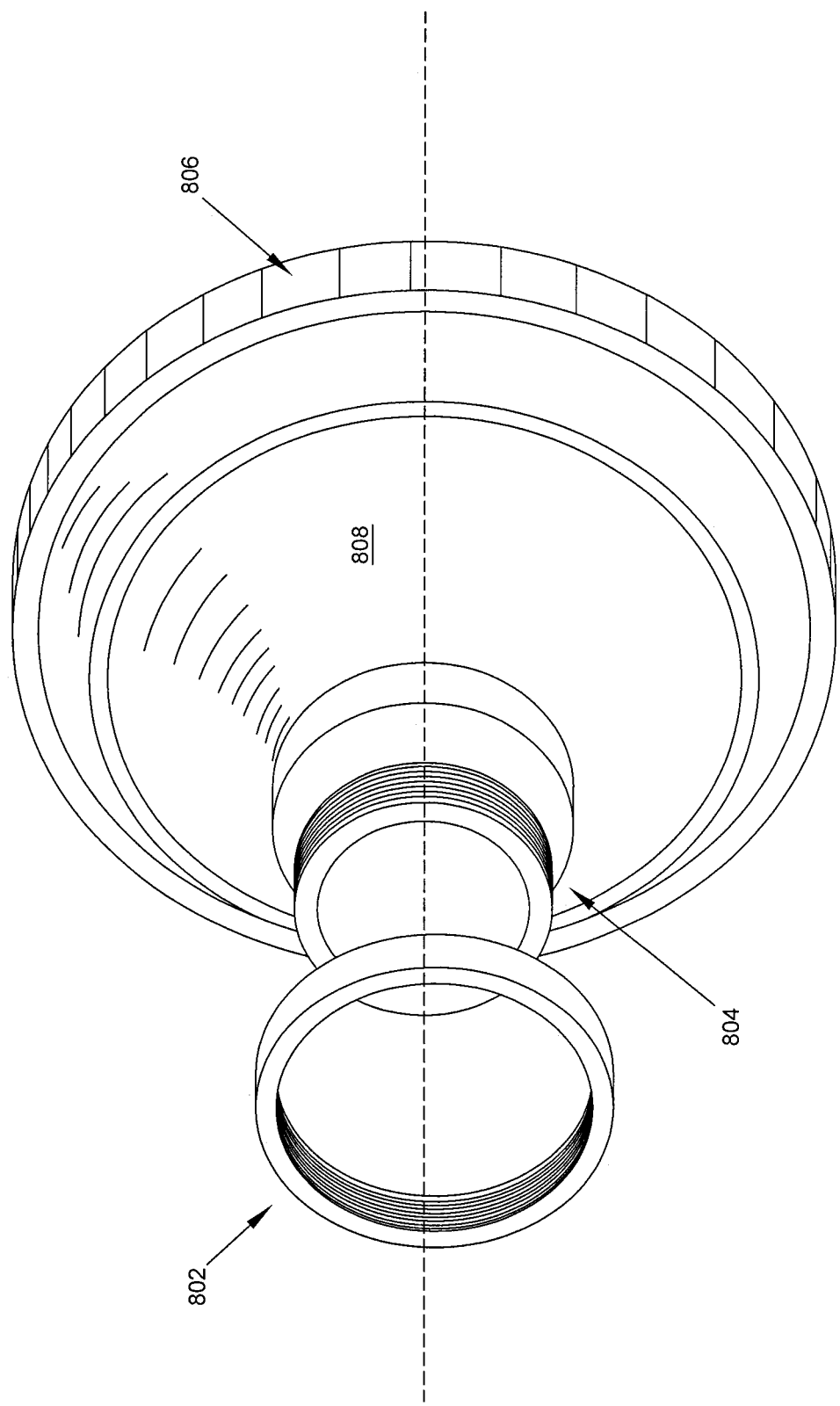
FIG. 8 is an isometric view of the spanner nut, drive arm with buttress threads and the cover plate.

FIG. 8 illustrates an isometric view of a spanner nut 802, drive arm 804 with buttress threads on a disc 806 covered by a full face cover plate 808.

Figure 9:
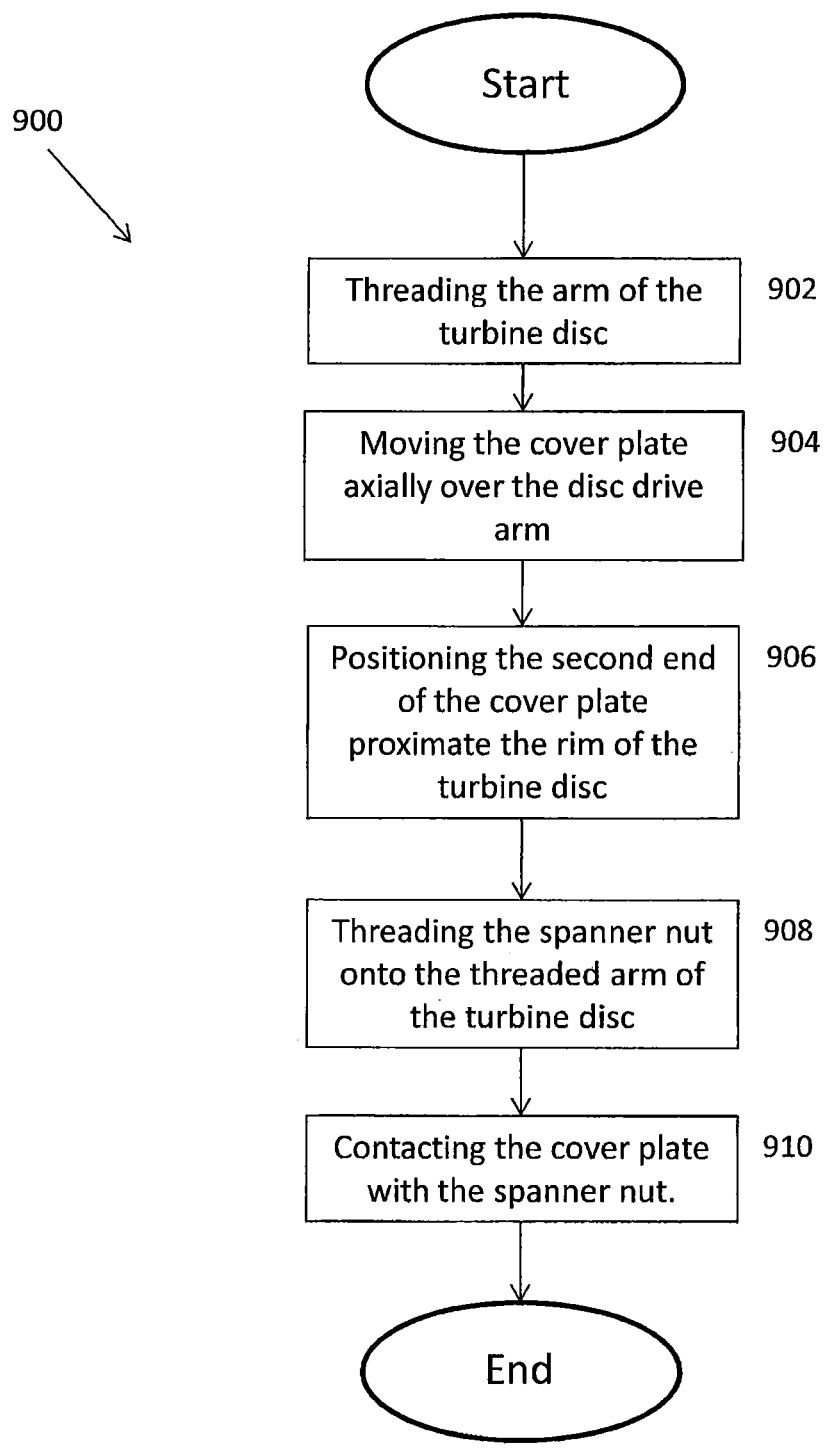
FIG. 9 is a method of assembly according to an embodiment of the current subject matter.

FIG. 9 is a flow diagram of a method of assembly 900 in accordance with some embodiments of the present disclosure. The method 900 is used in the assembly of a turbine jet engine. The engine comprises a turbine disc and a cover plate for the turbine disc. Both the disc and the plate are coaxial the engine axis. The turbine disc comprises an arm extending axially from the disc and a rim around the periphery of the disc. The cover plate defines a first end and a second end, each opening concentric with and having a radius greater than that of the arm of the turbine disc.

The method 900 begins at block 902 where the arm of the turbine disc is threaded to produce a threaded arm. The arm may be threaded with buttress threads. At block 904 the cover plate is moved in an axial direction such that the turbine arm is located within the openings of the cover plate. The second end the cover plate is positioned proximate to the rim of the turbine disc at block 906. In some embodiments, the second end is placed proximate to a face of the rim of the turbine disc and/or pilot tabs. At block 908, a rotation is applied to the spanner nut thereby threading the spanner nut onto the threaded arm. This rotation is coaxial with the turbine axis. Threading the spanner nut results, at block 910, in the contact between the spanner nut and cover plate. This contact applies a force to the cover plate which retains the second end of the cover plate against the turbine disc, rim and/or pilot tabs. In some embodiments, the spanner nut is rotated until it is in contact with an axial stop which extends radially inward from the first end of the cover plate. The force retaining the cover plate may be predetermined and correspond to the amount of rotation of the spanner nut.

Figure 10:
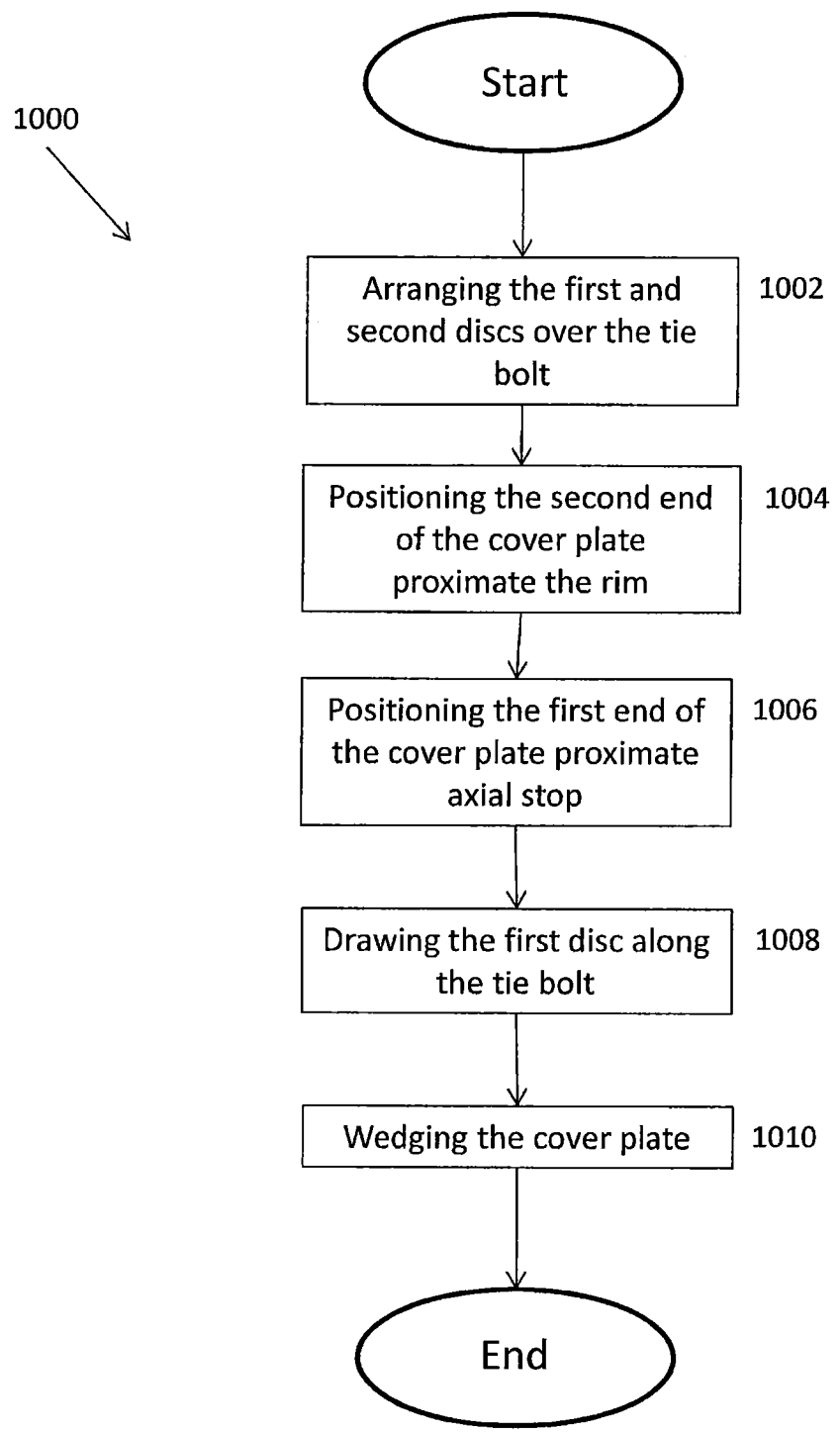
FIG. 10 is a method of assembly according to an embodiment of the current subject matter.

FIG. 10 shows a flow diagram of a method 1000 of assembling a multi-stage turbine with a cover plate for the second stage in accordance with some embodiments of the present disclosure. The method 1000 is used in a gas turbine engine comprising a first and second turbine disc and a cover plate. The first and second discs are coaxial with the turbine axis. The first turbine disc has an axial stop. The axial stop may be a groove. The second turbine disc has an arm extending axially from the second turbine disc and a rim around the periphery of the second disc. The second disc may further comprise an arrangement of pilot tabs around its periphery. The cover plate defines at least a first and second opening, each opening concentric with and having a radius greater than the arm of the second disc.

The method 1000 begins at block 1002 wherein the first and second discs are axially arranged over the tie bolt with the cover plate positioned between the first and second discs. The second end of the cover plate is positioned proximate to the rim of the second disc at block 1004 and the first end of the cover plate is placed proximate to the axial stop at block 1006. At block 1008, the first disc is drawn axially along the tie bolt by threading the spanner nut onto the tie bolt until the axial stop is in contact with the cover plate and the arm. This clamps the cover plate, at block 1010, against the axial stop and the rim, pilot tabs and/or second disc, thereby securing it in place. In some embodiments the axial force is predetermined and corresponds to the rotation of the spanner nut.

Although examples are illustrated and described herein, embodiments are nevertheless not limited to the details shown, since various modifications and structural changes may be made therein by those of ordinary skill within the scope and range of equivalents of the claims.

I claim:

1. A turbine assembly, comprising:
    a turbine disc having a central axis and a radially outer rim, said radially outer rim forming a radially inward facing surface;
    a turbine drive arm axially extending from and coaxial with said turbine disc, said turbine drive arm having a threaded portion;
    a spanner nut coaxial with the turbine disc and threaded on said turbine drive arm; and
    a turbine cover plate having a first end proximate to said turbine drive arm and a second end proximate to said radially outer rim of said turbine disc, wherein said first end and said turbine disc define a free space therebetween having an axial distance;
    wherein, at the axial distance, said spanner nut is in contact with said turbine cover plate proximate to said first end such that a force is transmitted from said first end through said turbine cover plate to said second end to thereby hold the second end in contact with said radially inward facing surface of said radially outer rim, wherein the axial distance can be reduced by increasing the force transmitted by the contact of said spanner nut with said turbine cover plate.

2. The turbine assembly of claim 1 wherein the radially outer rim comprises an arrangement of plural turbine blade inserts, the arrangement coaxial with the turbine disc, said second end of the turbine cover plate restricting axial movement of the plural turbine blade inserts.

3. The turbine assembly of claim 1, wherein the radially outer rim comprises a plurality of turbine disc pilot tabs, wherein one or more of the plurality of turbine disc pilot tabs form the radially inward facing surface of the radially outer rim.

4. The turbine assembly of claim 1, wherein the turbine cover plate comprises an axial stop extending radially inward from the first end and engaging the spanner nut.

5. The turbine assembly of claim 1, further comprising a relative rotation locking device preventing relative rotation of the spanner nut with the turbine disc arm, wherein the relative rotation locking device is selected from the group consisting of locking plates, retaining rings, tangs, lugs and keys.

6. The turbine assembly of claim 5, wherein the spanner nut further comprises a feature complementary of the relative rotation locking device wherein the feature is selected from the group consisting of a dimpled surface, a facet and a slot, and a scalloped surface.

7. In a gas turbine engine having a turbine disc having a central axis and a radially outer rim, said radially outer rim forming a radially inward facing surface, a turbine drive arm axially extending from and coaxial with said turbine disc, a spanner nut coaxial with the turbine disc, and a turbine cover plate having a first end and a second end, a method of retaining the turbine cover plate comprising:
    threading the turbine drive arm of the turbine disc to produce a threaded turbine drive arm;
    moving the turbine cover plate in an axial direction such that the threaded turbine drive arm is within an opening defined by the second end;
    after the step of moving the turbine cover plate, continuing to move the turbine cover plate in the axial direction such that the threaded arm is within a second opening defined by the first end;
    positioning the second end of the turbine cover plate proximate the radially outer rim of the turbine disc, wherein said positioning defines a free space between said turbine cover plate and said turbine disc having an axial distance;
    applying a rotation to the spanner nut to thread the spanner nut onto the threaded turbine drive arm, wherein the rotation is coaxial with the axis; and
    contacting, with the spanner nut and at the axial distance, the turbine cover plate to apply a force that is transmitted from the first end through the turbine cover plate to thereby hold the second end in contact with the radially inward facing surface of the radially outer rim, and wherein increasing the applied force can reduce the axial distance.

8. The method of claim 7, wherein the radially outer rim further comprises a plurality of pilot tabs and wherein one or more of the plurality of pilot tabs form the radially inward facing surface of the radially outer rim.

9. The method of claim 7, wherein the step of contacting, with the spanner nut, the turbine cover plate further comprises extending an axial stop radially inward from the first end of the turbine cover plate and contacting with, the spanner nut, the axial stop.

10. The method of claim 7, wherein the force is predetermined and corresponds to the rotation of the spanner nut.

11. A turbine assembly, comprising:
- a turbine disc having a central axis and a radially outer surface;
- a turbine drive arm axially extending from and coaxial with said turbine disc said turbine drive arm having a threaded portion;
- a spanner nut coaxial with the turbine disc and threaded on said turbine drive arm; and
- a turbine cover plate having a first end proximate to said turbine drive arm and a second end proximate to said radially outer surface of said turbine disc, wherein said first end and said turbine disc define a free space therebetween having an axial distance;
- wherein, at the axial distance, said spanner nut is in contact with said turbine cover plate proximate to said first end such that force is transmitted from said first end through said turbine cover plate to said second end in contact with the radially outer surface, wherein the axial distance can be reduced by increasing the force transmitted by the contact of said spanner nut with said turbine cover plate.

* * * * *